United States Patent [19]

Wyman et al.

[11] Patent Number: 4,813,000

[45] Date of Patent: Mar. 14, 1989

[54] COMPUTERIZED COLOR MATCHING

[75] Inventors: Larry D. Wyman, Irving; Joseph D. Webb, Garland, both of Tex.

[73] Assignee: Jones-Blair Company, Dallas, Tex.

[21] Appl. No.: 883,593

[22] Filed: Jul. 9, 1986

[51] Int. Cl.⁴ .................... G01N 21/25; G06F 15/20
[52] U.S. Cl. ................................. 364/526; 356/402; 356/408; 364/502
[58] Field of Search ............... 369/526, 502; 356/402, 356/405, 408

[56] References Cited

U.S. PATENT DOCUMENTS

| | | | |
|---|---|---|---|
| 1,806,198 | 5/1931 | Hardy | 364/526 |
| 2,540,797 | 2/1951 | Stearns | 364/526 |
| 3,032,269 | 5/1962 | Davidson | 364/526 |
| 3,060,790 | 10/1962 | Ward | 364/526 |
| 3,159,742 | 12/1964 | Davidson | 364/526 |
| 3,247,815 | 4/1966 | Polevitsky | 364/526 |
| 3,476,132 | 11/1969 | Gebel | 356/405 X |
| 3,505,980 | 4/1970 | Bentley et al. | 364/526 |
| 3,601,589 | 7/1971 | McCarty | 364/526 |
| 3,619,253 | 11/1971 | Hoffmeyer | 356/408 |
| 3,781,909 | 12/1973 | Sterns | 364/526 |
| 3,916,168 | 10/1975 | McCarty et al. | 364/526 |
| 3,924,244 | 12/1975 | Seitz | 364/526 |
| 3,980,181 | 9/1976 | Hoover et al. | 356/408 |
| 3,999,045 | 12/1976 | Schwartz et al. | 364/526 |
| 4,025,199 | 5/1977 | Akami | 356/408 |
| 4,132,314 | 1/1979 | von Beckmann | 364/526 |
| 4,185,920 | 1/1980 | Suga | 356/405 X |
| 4,259,020 | 3/1981 | Babb | 356/402 |
| 4,389,706 | 6/1983 | Gomola et al. | 364/200 |
| 4,439,038 | 3/1984 | Mactaggart | 364/526 |
| 4,524,421 | 6/1985 | Searby et al. | |
| 4,579,670 | 7/1986 | Ohashi et al. | 364/526 X |
| 4,613,947 | 9/1986 | Suzuka et al. | 364/526 |

FOREIGN PATENT DOCUMENTS

| | | | |
|---|---|---|---|
| 55-106323 | 8/1980 | Japan | 356/405 |
| 55-109936 | 8/1980 | Japan | 356/405 |
| 60-171424 | 9/1985 | Japan | 364/526 |

*Primary Examiner*—Felix D. Gruber
*Attorney, Agent, or Firm*—Sigalos, Levine & Montgomery

[57] ABSTRACT

Method and apparatus for matching a selected color with predetermined available paint colors wherein a portable color meter is used to analyze a selected color and store chromaticity data representing the hue, chroma and brightness of the selected color. That stored chromaticity data is coupled to a computer which compares it with stored chromaticity data in the computer representing available color formulas and then selects one of the stored paint formulas most closely matching the chromaticity data representing the selected color.

12 Claims, 1 Drawing Sheet

COMPUTERIZED COLOR MATCHING

BACKGROUND OF THE PRESENT INVENTION

The present invention relates to a method and apparatus for matching selected color with predetermined available paint pigments and in particular relates to the use of a portable tri-stimulus color meter which stores data representing an unknown color and which may be hardwire interfaced directly with a computer to provide a simple to use yet extremely flexible system for providing a color formula most closely matching the color data of unknown color at the touch of a computer key. The color matching algorithms search a large data base of known and available color formulas for the closest match with the unknown color. "Available color formula" means a verified color formula that has actually been mixed as a paint. In addition, the use of a portable color meter allows the meter to be disconnected from the system and taken into the field to obtain a color reading at a remote location and then subsequently reconnected to the system whereupon the stored color data may be directly read by the computer through the hard wire interface for color matching. Alternatively, the data displayed by the color meter may be communicated to the system in any well-known manner, as by telephone, from a remote location and entered into the computer through a keyboard.

Color matching systems are well known in the art as set forth in U.S. Pat. No. 3,601,589. In this patent, a computer assisted color matching technique is disclosed which determines the total spectral reflectance of an unknown color panel by a scanning spectrophotometer and then submits the reflectance data to a computer which generates a theoretical color match by mathematical manipulation of previously stored data representing K and S values (absorption and scattering respectively) of pure pigments. The disclosure relates basically to a set of computational procedures which allow for the calculation of K (absorption) and S (scattering) values for a set of wave lengths and further determines a set of pure pigments such that the combined K and S values of the pigments equal the K and S values for the unknown color at each wave length of the set. This is the basic color matching algorithm used by other spectrophotometric based color matching systems.

The problems with these systems are that, first, they are extremely expensive and difficult to maintain and secondly, they generate a theoretical color match utilizing data obtained for the unknown as well as the known pure pigments of the unknown color. Thus the final color which is obtained by mixing pigments according to the calculated color values may turn out to be a color different than the unknown color. The color match formula is normally a first mathematical approximation which must be corrected and adjusted by correcting software which is a part of the system.

The present system has several advantages over the prior art systems. First, the color meter is a portable device well known in the art which may be taken into the field to obtain a color reading at a remote location and store chromaticity data represented by three values such as the well-known L*a*b* measurement. The color meter is subsequently transported back and reconnected to the computer system whereupon the stored color data may be directly read by the computer through the hard wire interface for color matching or the three values could be entered into the computer through a keyboard.

In addition, the computer searches a large data base of known and available color formulas, each of which is represented by three values such as the well-known L*a*b* values, for the closest match, not necessarily an identical match. The three values providing the closest match point to or request an existing paint formulation stored in another area in the computer memory which can to be utilized to provide a paint that is a closest match to the unknown color.

Thus, in the present apparatus and method, the color meter may be transported to a remote location to obtain a color reading of some particular unknown color, transported back to the central location of the computer, such as at a paint store, and connected to the computer which then extracts the data from the color meter, or alternatively, the three values representing the chromaticity data are keyed into the computer through the keyboard. In either case, the computer searches through a large data base comprised of three values representing each available paint formula to find the closest match. Once the three values representing the closest match are found, they point to and select the corresponding paint formula from a group of stored paint formula in the computer memory. The selected formulas can be used to control the mixing of the pigments necessary to obtain the closest available color match. This has not been heretofor possible in the prior art since, with existing systems, the unknown color must first be brought to the central location of the computer where the computer generates an approximate color formulation of the unknown color which then may have to be corrected and adjusted to find the closest match.

Thus it is an object of the present invention to provide a color matching system in which color data representing an unknown color is determined and then compared with a large data base of available color formulas to determine the closest match.

It is also an object of the present invention to provide a portable color meter which can be taken to a remote location to obtain a color reading and then the reading entered into the computer through a keyboard or the meter is transported to the central location for hard wire coupling to a computer to analyze the stored data and determine the closest match available.

SUMMARY OF THE PRESENT INVENTION

Thus the present invention relates to a method of matching a selected color with predetermined available paint colors to obtain the closest match comprising the steps of using a portable color meter to analyze the selected color and store chromaticity data representing the hue, chroma and brightness of the selected color, coupling the selected chromaticity data in the portable color analyzer to a computer, comparing the selected color chromaticity data representing the selected color with stored data in the computer representing available paint formulas and selecting the one of the stored available paint formulas most closely matching the chromaticity data representing the selected color.

The invention also relates to apparatus for matching a selected color with predetermined available paint colors comprising a portable color meter for analyzing the selected color and storing chromaticity data representing the hue, chroma and brightness of the selected color, a computer for storing a plurality of available paint formulas, means for coupling the stored chromaticity data in the portable color meter to the computer, means in the computer for comparing the selected color chromaticity data with the stored data representing available paint formulas, and means for selecting the one of the stored available paint formulas most closely matching the chromaticity data representing the selected color.

BRIEF DESCRIPTION OF THE DRAWINGS

These and other objects of the present invention will be more clearly understood in conjunction with the accompanying drawings in which.

DETAILED DESCRIPTION OF THE DRAWINGS

Figure 1:
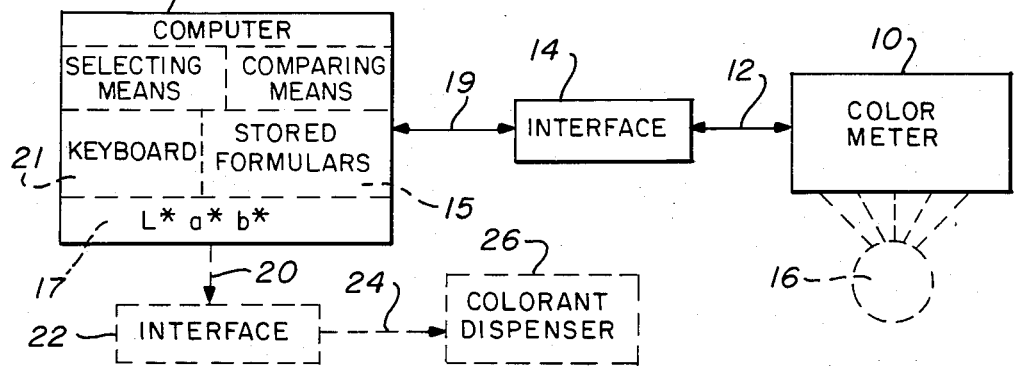
FIG. 1 is a block diagram representing the novel paint color matching system.

In FIG. 1, the color meter 10 represents a portable, well-known color meter such as the Minolta Chroma meter CR-100/CR-110 which is a portable light weight, compact tri-stimulus color analyzer for measuring reflected color. Readings are taken through the measuring head, processed by a built in microcomputer and presented digitally on the custom designed liquid crystal display. Five measuring modes are selectable according to need. There are two chromaticity measuring modes and three color deviation measuring modes. For two colors to appear to match, three quantities defining these colors must be identical. These three quantities are called tri-stimulus values XYZ as determined by the CIE (Commission Internationale De L'Eclairage) in 1931. Color as perceived has three dimensions; hue, chroma and brightness. Chromaticity includes hue and chroma (saturation), specified by the x and y in a CIE chromaticity diagram well known in the art. Since this is a two dimensional diagram it cannot describe a specific color completely and therefore a brightness factor must also be included to identify a sample precisely.

There are several well-known methods of determining the values necessary to indentify a specific color. With the present system, the color meter chromaticity measuring mode utilized is the well known L*a*b* measuring mode. This mode is concerned with human sensitivity to colors and is the only mode used on the color meter specified herein in the present system except for calibrating the instrument and then the well-known Yxy mode is used.

Thus in FIG. 1 the well-known portable color meter 10 may be transported to any desired location and a color is reading obtained from an unknown color 16. The reading is stored in the color meter 10 and displayed in the form of three chromaticity values representing hue, chroma and brightness and designated as the well-known L*a*b* values. When the color meter 10 is transported back to the computer location, a hard wire cable 12 is coupled between the color meter 10 and an interface board 14 which is in and a part of computer 18 and which allows the computer 18 to communicate through cables 12 and 19 with the color meter 10. The three values displayed by and stored in the color meter may also be entered into the computer through its keyboard 21. This allows the three value L*a*b* data to be called in by telephone or other means from a remote location and entered into the computer 18 through keyboard 21. The computer 18 has stored therein a large data base of available color formulas 15 (fifteen thousand or more) of available paints. Each formula is also represented by three values stored in memory area 17 and which values are designated by the well-known L*a*b* values which, again, are hue, chroma, and brightness and representing each paint to be formed by the available paint formulas stored in memory area 15. The computer 18 requests the data from the color meter 10 to be transmitted to the computer 18, if the data is not entered through the keyboard, and the computer 18 then compares the three values representing the color formula of the unknown color 16 with each of the three values stored in the memory area 17 of the computer 18 representing a respective one of a plurality of paints to be formed with the use of the stored available paint formulas and selects the one of the three stored values in memory 17 representing the available paint formula in memory area 15 most closely matching the three values representing the color of the object 16. Once the computer 18 has found the closest match of the three chromaticity values, it selects the available paint formula stored in area 15 corresponding to those three closest matched values. It then generates signals on line 20 which are coupled through an interface 22 and line 24 to a colorant dispenser 26 which mixes the proper paint colorants to obtain the closest color paint which would match the unknown color of the object 16. The computer 18 may be, for example, an IBM PC Computer.

Figure 2:
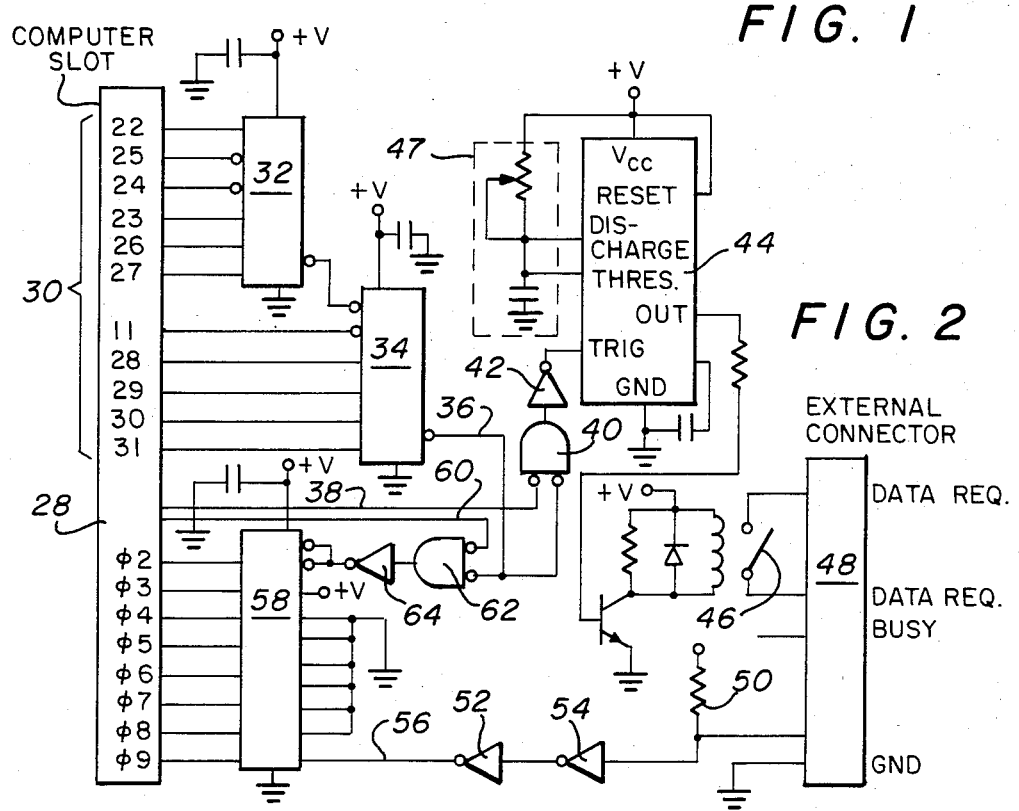
FIG. 2 is a schematic drawing of the interface which couples the portable color meter with the computer shown in FIG. 1.

The details of the interface in FIG. 1 which is located between the color meter and the computer involves a cable 12, and a board 14 which takes samples of the signal and allows the computer 18 to accept them on its data base from lines 12 and 19. The board 14 actually forms a part of the computer and is mounted internally in the computer in one of the computer input slots. As indicated earlier, this particular circuit is made to interface the IBM PC Computer by using one of the addresses set aside for proto-type boards. The specific address that is decoded for this use is 308 hexadecimal. Thus, as can be seen in FIG. 2, a ten bit IO address 30 is coupled through the appropriate pins of connector 28 to decoders 32 and 34 which decode the 10 bit IO address. The output of decoder 34 on line 36 is combined with the signal on IO write line 38 by NOR-negated input AND gate 40 and inverter 42 to trigger a timer 44 which controls a relay 46. Relay 46 is used to request data from the color meter 10. Lines 4 and 5 of external connector 48, when connected by relay 46, trigger the color meter. A resistor/capacitor time constant 47 is provided to adjust the ON time of the relay 46. Maximum ON time for the relay is around 0.47 seconds.

After lines 4 and 5 of connector 48 have been closed (data request) the color meter will start sending its stored three value L*a*b* data through its data output line to pin 2 of connector 48. A 10K pull-up resistor 50 coupled to the five volt power supply present on the board provides TTL (transistor transistor logic) level signals. Data is then fed through the two inverters 52 and 54 for buffering and shaping. The output of the inverters on line 56 is coupled to an input of an octal buffer 58. The buffer 58 provides the interface to the PC data bus on terminal 28. The address decode signal on line 36 and the signal on IO READ line 60 are combined through NOR-negated input AND gate 62 and inverter 64 and connected to the buffer 58 to provide the WRITE signal to the PC data bus.

Thus the IBM PC Computer 18 can interrogate the color meter 10 and receive data therefrom in order that it can be processed. Also, as stated previously, the three value L*a*b* data sets can be read on the color meter display and entered into computer 18 through keyboard 21. In computer 18, as stated earlier, the chromaticity data represented by the three values L*a*b* measurement data and received from the color meter 10 through the interface board 14 is compared with the stored data in the computer representing available paint formulas. As pointed out earlier, these three values are those which represent the well-known L*a*b* color measurement. One of these sets of three values is stored in the computer for each available color formula. Also stored are the available color formulas themselves (which may be 15,000 or more). The computer then compares the three value chromaticity data set from the color meter 10 with all the stored three value chromaticity data sets to find the nearest match and then selects the one of the stored paint formulas represented by the nearest match which most closely matches the selected unknown color. Once the computer 18 has selected the available color stored paint formula most closely matching the selected unknown color, it generates signals on line 20 through interface 22 and cable 24 to the colorant dispenser 26. See FIG. 1.

Figure 3:
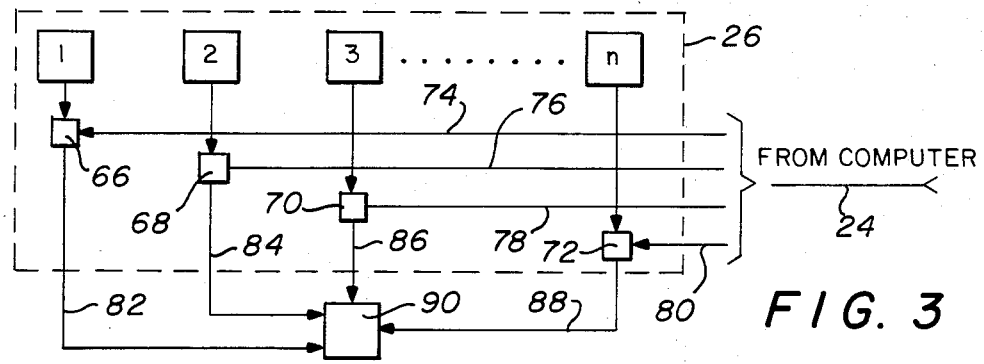
FIG. 3 is a schematic representation of the paint mixing system which may be controlled by the output from the computer to actually mix the paints to obtain the available color most closely matched with the unknown color.

The details of the colorant dispenser are shown in FIG. 3 and are well-known in the art. Thus a signal appearing on lines 74, 76, 78 and 80 may be from the computer 18 or from a light pen which can read the available color formula selected and visually displayed by the computer 18. The signal on lines 74, 76, 78 and 80 operate metering pumps 66, 68, 70 and 72 to allow predetermined quantities of paint from containers 1, 2, 3, through n to be mixed and result in a paint color 90 which most closely matches the selected unknown paint color.

As mentioned above, the computer 18 may be, for example, an IBM PC Computer. In the examples set forth herein, an IBM PC-XT Computer was used together with the following program. The program is menu driven. After the computer has been booted, a menu appears on the screen, including an item called "Match". When "Match" is selected, the computer then asks for a general identification of the color. This is merely for subsequent use by the computer operator to identify any printout with the sample under investigation. After manual entry through the keyboard of an appropriate identifying name, e.g. "BROWN TABLE", the computer then presents an additional menu, including a selection "I", which stands for instrument. When the color meter is connected to the computer, and when selection "I" is made, the above-described sequence is initiated, namely, the interrogation by the computer of the color meter and the transfer of the three-element color data from the color meter to the computer. The computer then proceeds automatically to search through its memory in the manner described above to produce the closest match, and the matching data results are then displayed on the screen for the use of the operator and/or is effective to transmit metering control signals over conductors 24 to the colorant dispenser 26 in the manner described above.

EXAMPLE I

The color meter was used to read color information data from a brown table. The meter was then transported to the computer, where it was connected to the computer. The computer was booted and the program menu was followed. When the item "match" appeared on the screen, it was selected and the computer then asked for a general identification of the color. The word "table" was then typed in manually on the computer keyboard, and after the return button was depressed, the computer proceeded to present an additional menu which included the selection "I". This item was then selected through manual manipulation of the keyboard and the computer then proceeded to search its memory for the closest match. At the conclusion of the search, the screen showed the following display:

| Color Match For Table Is: | | | | | | | |
|---|---|---|---|---|---|---|---|
| Color Diff = 0.9 | | | (Excellent Match) | | | | |
| Use White Base | | | | | | | |
| Quart | | Gallon | | | | Five Gallons | |
| EE | 1 | EE | 6 | | EE | 30 | |
| FF | 12 | FF | 1 | OZ 0 | FF | 5 | OZ 0 |
| JJ | 4 | JJ | 18 | | JJ | 1 | OZ 42 |
| Press Any Key to Continue. | | | | | | | |

EXAMPLE II

According to another example, the color data from a metal drawer was obtained by use of the color meter, which then was connected to the computer in the manner described in respect of Example I above. After the computer had searched its memory for the closest match, the video screen displayed the following:

| Color Match for Metal Drawer Is: | | | | | | | |
|---|---|---|---|---|---|---|---|
| Color Diff = 1.3 | | | (Good Match) | | | | |
| Dark 1.1 Units | | | (Slightly Dark) | | | | |
| Use Neutral Base | | | | | | | |
| Quart | | | Gallon | | | Five Gallons | |
| CC | 27 | | CC | 2 OZ 12 | CC | 11 OZ | 12 |
| EE | 1 OZ 6 | | EE | 4 OZ 24 | EE | 22 OZ | 24 |
| RR | 27 | | RR | 2 OZ 12 | RR | 11 OZ | 12 |
| VV | 36 | | VV | 3 OZ 0 | VV | 15 O | 0 |
| Press Any Key to Continue. | | | | | | | |

In the foregoing examples, the color monitor obtained readings for the color of a table and for a metal drawer. These were accepted by the computer in the manner described herein, and in response thereto, after having been processed by the computer, there appeared on the screen the data shown above. In order to interpret such data, it is helpful to know that the alphabetical letters designate a pigment color, and the arabic numerals represent the quantity, in 48ths of a fluid ounce, of the pigment concentration. EE stands for black, FF stands for dark brown oxide, JJ stands for light yellow oxide, CC is blue, RR is red, and VV is a white tint.

As will be obvious from the foregoing, the indicated quantities may be manually mixed together with a white base in the case of example 1, and a neutral base in the case of example 2 in order to produce the displayed quantity of matching paint color.

As will be observed from reference to the video displays, the pressing of any key on the keyboard will cause the program to resume running and display a prompt which, if selected, will result in activation of colorant dispenser 26 to operate metering pumps 66, 68, 70 and 72 selectively, to allow the selected quantities of paint from containers 1, 2 and 3 thru n to be mixed and result in the desired paint color.

The program that was employed to practice the invention is listed in the appendix to this specification.

Thus there has been disclosed a color matching system which has the advantages of utilizing a portable color meter which can be transported to some remote location and a color reading obtained and then transported to a central location, such as a paint store, where a computer is located. The computer is then coupled to the color meter which samples the data stored in the color meter representing the unknown color.

Further the data stored in the color meter is also displayed visually by the color meter and can be communicated from a remote location, as by telephone, to the computer location where the data can be entered into the computer through a keyboard.

The computer then compares the unknown color data with a data base representing available color formulas to provide the closest match to the unknown color and then can be used to operate a colorant dispensing system to provide a paint which most closely matches the unknown color. This system is economical, simple to use, and provides a final paint which is as close to the unknown color as can be matched from available color formulas.

While the invention has been described in connection with a preferred embodiment, it is not intended to limit the scope of the invention to the particular form set forth but, on the contrary, it is intended to cover such alternatives, modifications, and equivalents as may be included in the spirit and scope of the invention as defined by the appended claims.

We claim:

1. A method of matching a selected color with predetermined available paint colors comprising the steps of:
   a. using a portable color meter to analyze said selected color and store chromaticity data representing the hue, chroma and brightness of said color,
   b. coupling said chromaticity data in said portable color meter to a computer,
   c. storing a plurality of available color formulas in said computer,
   d. storing chromaticity data in said computer representing hue, chroma and brightness of each paint designated by each of said stored available color formulas,
   e. comparing the chromaticity data received from said portable color meter with the stored chromaticity data representing each of said stored available color formulas to find the closest match, and
   f. selecting the stored color formula represented by said chromaticity data found to be said closest match thereby matching said selected color.

2. A method as in claim 1 further comprising the step of storing said chromaticity data in said color meter and said computer in the form of three values designated as the L*a*b* color measurement values.

3. A method as in claim 1 further comprising the steps of:
   a. locating said computer in a fixed location,
   b. utilizing said color meter at a location remote from said computer to analyze said selected color and store said chromaticity data,
   c. transporting said color meter with said stored chromaticity data from said remote location to said computer at said fixed location, and,
   d. coupling said color meter to said computer for enabling said closest color match to be obtained.

4. A method as in claim 1 further comprising the steps of:
   a. locating said computer in a fixed location,
   b. utilizing said color meter at a location remote from said computer to analyze said selected color and display said chromaticity data,
   c. transmitting said displayed chromaticity data from said remote location to said computer at said fixed location, and,
   d. entering said transmitted data into said computer for enabling said closest color match to be obtained.

5. A method as in claim 3 further comprising the steps of:
   a. providing a plurality of containers of liquid paint colors, and
   b. utilizing said selected available paint formula to mix predetermined ones of said liquid paint colors to obtain a paint of the closest match of said selected color.

6. A method as in claim 5 further comprising the steps of:
   a. providing metering pumps on each of said paint containers to allow or prevent paint flow from said containers, and
   b. operating said metering pumps in accordance with said selected one of said stored available paint formulas to provide a paint of closest match with said selected color.

7. Apparatus for matching a selected color with predetermined available paint colors comprising:
   a. a portable color meter for analyzing said selected color and storing chromaticity data representing the hue, chroma and brightness of said selected color,
   b. a computer for storing a plurality of available paint formulas and storing chromaticity data representing the hue, chroma and brightness of each paint designated by said stored available paint formulas,
   c. means for coupling said stored chromaticity data in said portable color meter to said computer,
   d. means in said computer for comparing said selected color chromaticity data with said stored chromaticity data in said computer representing each paint designated by said stored available paint formulas to find the closest match, and
   e. means for selecting the one of said stored available paint formulas represented by a said closest match chromaticity data thereby matching said selected color.

8. Apparatus as in claim 7 further comprising means for storing said chromaticity data in said color meter and said computer in the form of three values designated as the L*a*b* color measurement values.

9. Apparatus as in claim 8 further comprising:
   a. means on said portable color meter for displaying said stored three value L*a*b* measurement data representing said selected color,
   b. means for transmitting said displayed data from said portable color meter to said computer at a location remote from said portable color meter, c. keyboard means for entering said three value L*a*b* measurement data into said computer for enabling said closest color match to be obtained.

10. Apparatus as in claim 7 further comprising:
a. a plurality of containers of liquid paint colors, and,
b. means for mixing predetermined ones of said liquid paint colors in accordance with selected available paint formula to obtain a paint of the closest match of said selected color.

11. Apparatus as in claim 10 further comprising:
a. metering pumps on each said paint containers to allow or prevent flow from said container, and
b. means for operating said metering pumps in accordance with said one of said stored available paint formulas selected by said computer to provide a paint of closest match with said selected color.

12. Apparatus as in claim 11 further comprising means coupling said computer to said metering pumps for controlling said pumps in accordance with said one paint formula representing the closest match to said selected color.

* * * * *